Figure 1:
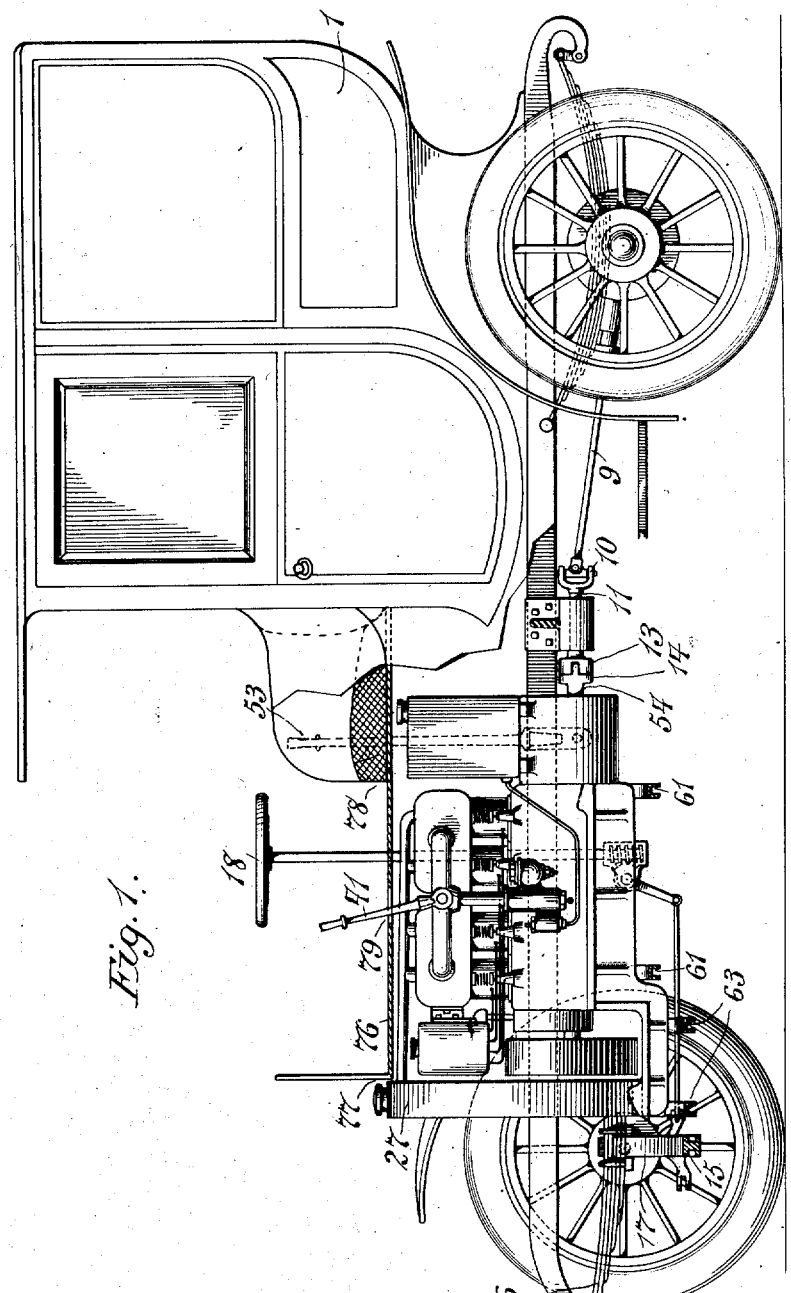

E. B. GALLAHER.
MOTOR VEHICLE.
APPLICATION FILED NOV. 20, 1907.

1,062,452.

Patented May 20, 1913.
4 SHEETS—SHEET 1.

Witnesses:
Edward Rowland
M. F. Keating

Inventor
Edward B. Gallaher
By his Attorney
Charles J. Kintner

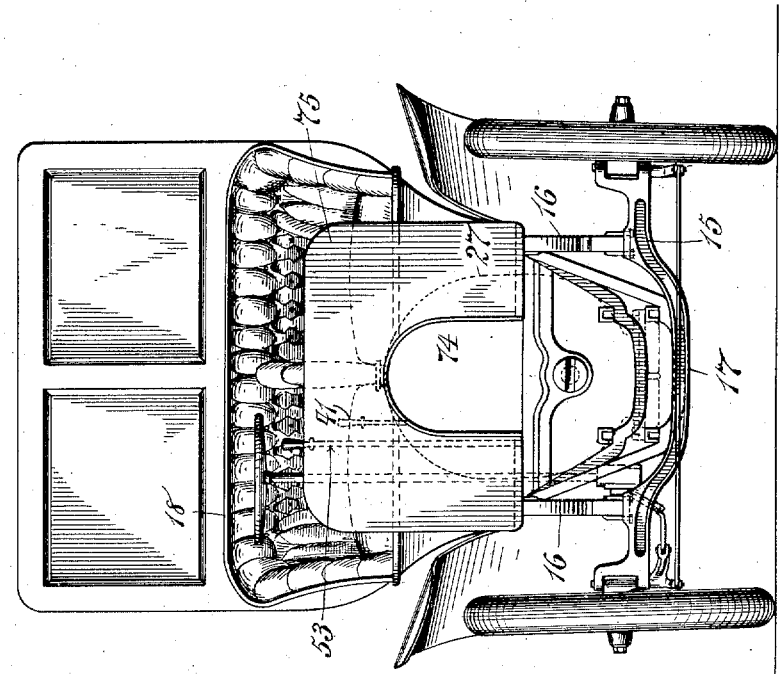

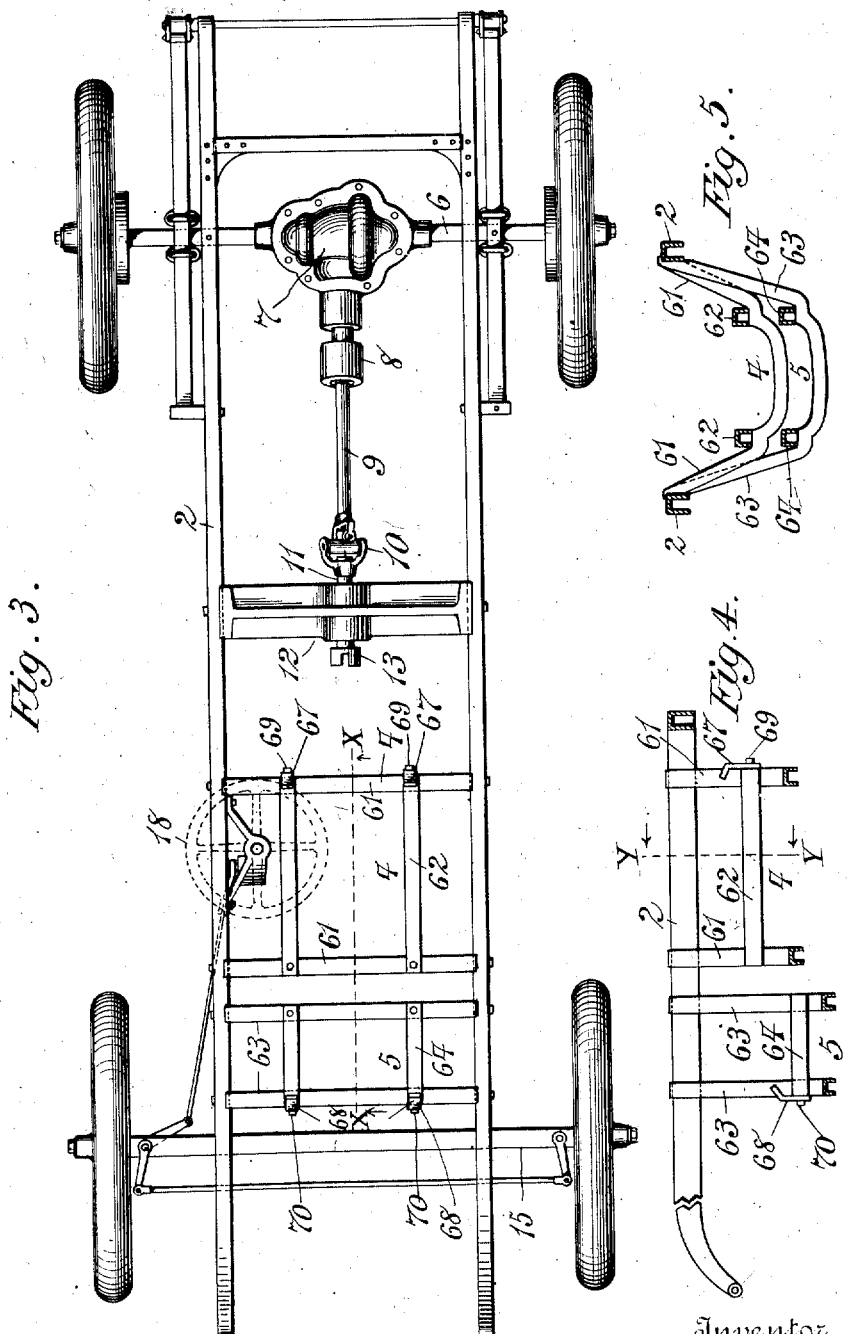

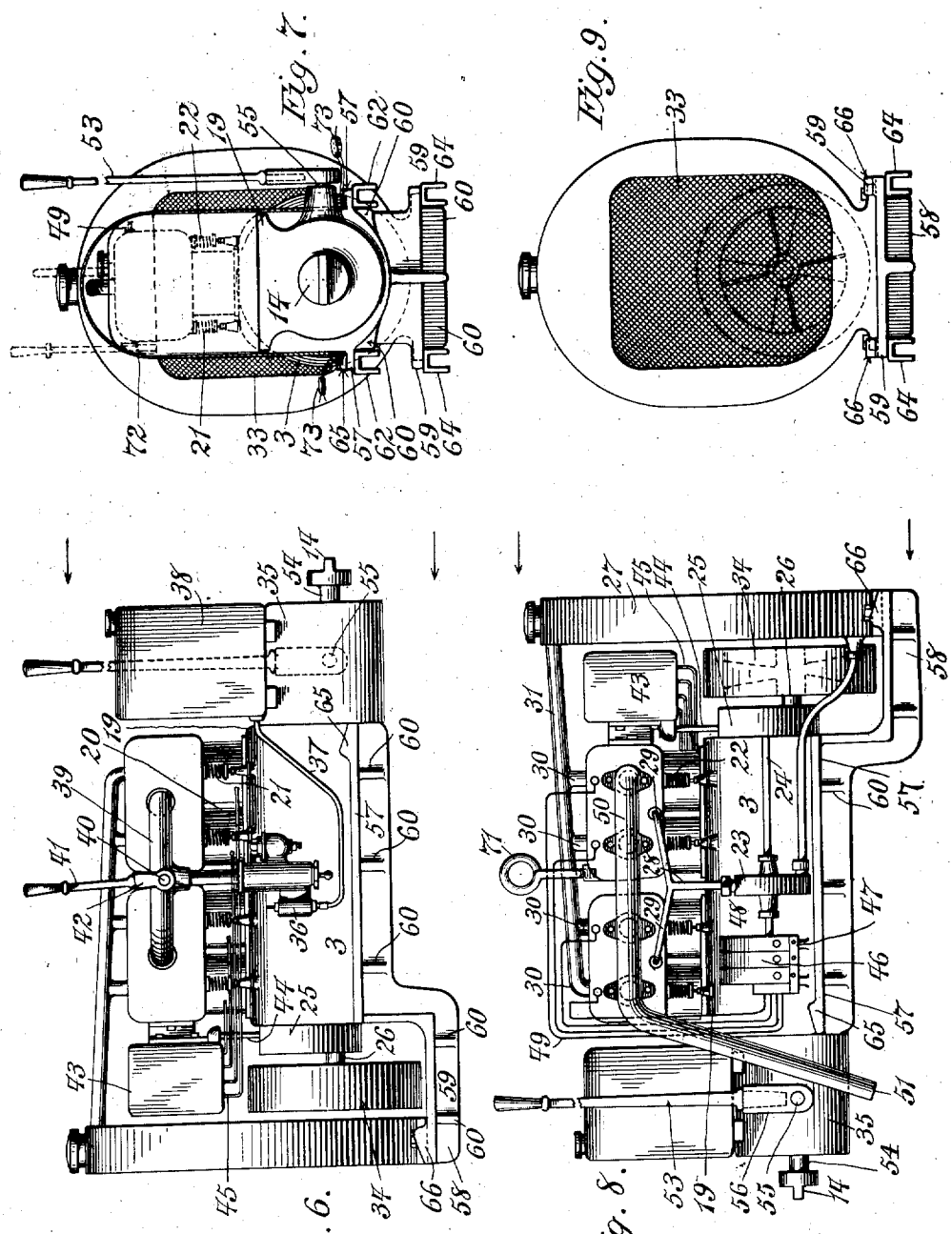

UNITED STATES PATENT OFFICE.

EDWARD B. GALLAHER, OF NEW YORK, N. Y., ASSIGNOR TO CLOVER MANUFACTURING COMPANY, OF NEW YORK, N. Y., A CORPORATION OF NEW YORK.

MOTOR-VEHICLE.

1,062,452.  Specification of Letters Patent.  Patented May 20, 1913.

Application filed November 20, 1907. Serial No. 402,982.

*To all whom it may concern:*

Be it known that I, EDWARD B. GALLAHER, a citizen of the United States, residing in New York, borough of Manhattan, county and State of New York, have made a new and useful Invention in Motor-Vehicles, of which the following is a specification.

My invention has especial relation to motor vehicles of the gasolene or explosive type, or to motor vehicles generally where the motors themselves and their immediate accessories are attached directly to and supported by the main frame or upon a subframe of the vehicle, whether the same be propelled by explosive gases, steam or other sources of energy, and it has for its objects—first, to increase the efficiency and also the life of what I term hereinafter the "power unit" of such vehicles. Second, to decrease the cost of running such vehicles by eliminating the daily cleaning of the "power unit", or the usual careful attention ordinarily required in investigating the many detachable parts of such "power unit". Third, to further decrease the cost of running such vehicles by eliminating the employment of semi-skilled mechanics, such as chauffeurs. Fourth, to make it possible to utilize every vehicle of a commercial plant for the maximum number of days per year and to thus insure increased returns to the owners of such vehicles. Fifth, to enable the utilization of different power units for the same running gear so as to adapt the vehicle for any emergency it may be called upon to fill, and to prevent the vehicle as a whole from being put out of commission for any length of time. Sixth, to assemble the individual elements of a power unit in such compact or close relation that the major portion thereof may be located as a whole directly under the front seat of the vehicle, or in any other place selected, whether it be accessible or not. Seventh, to effect the shortening of the wheel bases of power impelled vehicles of relatively high horse power without decreasing the space occupied by the body, thereby adapting them for use in large cities where difficulty of manipulation is had in the use of motor vehicles of relatively long wheel bases. Eighth, to provide means for permitting of the removal of a power unit as a whole from the chassis of a motor vehicle and for replacing it therein in the shortest possible time. Ninth, to reduce the cost of construction of motor vehicles of the explosive type and to permit of the construction thereof out of lighter material, owing to the more compact assemblage of parts. Tenth, to increase the strength of such vehicles by reason of the compact nature of the power unit and its detachable sustaining base which acts not only as a sustaining base but also as additional bracing means for limiting the strains put upon the frame proper. Eleventh, to provide a standardized base for the power unit of a motor vehicle comprising the motor, and all or a part of the accessories thereof so constructed as to adapt it for use with various types of motor vehicle frames, and to be detachably secured thereto.

It is well known in the art that there are two or three specific elements which render the operation of commercial vehicles of all sorts most difficult and which, in reality, make the gasolene motor vehicle of today almost impractical for commercial purposes. In order to clearly understand these difficulties they should be taken up, each one separately and discussed individually. The first difficulty encountered is the excessive wear and tear which a motor vehicle receives in its every day operation, it being found in practice that the wear and tear of such vehicles depreciate the value thereof at the rate of at least 50% per annum, and this is particularly the case where commercial vehicles are utilized. The second cause of trouble lies in the chauffeur or mechanic. This semi-skilled person at the present time has full charge of the vehicle which he operates which, due to the form of the vehicle or its arrangement of parts, makes his employment a positive necessity; and the actual success or failure of the vehicle on the street depends almost wholly upon whether such chauffeur or mechanic is capable or incapable. It is a well known fact that a very small percentage indeed of these men are capable. They have entered the business in many ways, the majority of them being professional bicycle riders, butlers, valets, car conductors, motormen and the like, without proper technical education. If, therefore, it becomes necessary to operate a large number of cars and to place them in the hands of such irresponsible and inefficient men, this means that every one of these vehicles will be run differently and give a different degree of service and satisfaction, according to the ability and willingness of the chauffeur. Another important element is found in the fact that where semi-skilled men of this kind are employed it is exceedingly difficult to hold them in check, and on the slightest provocation they form into unions or other bodies and march out, leaving the operating company stranded for want of help, and it is almost impossible to break in another set of men without serious delay and great damage being done to the cars and other property. If, therefore, this semi-skilled chauffeur can be entirely eliminated from the problem we will have solved one of the most important difficulties which confronts particularly the efficient commercial vehicle of today. There is one other condition which it has been found in practice gives a great deal of trouble in this same connection. A man who is unskilled in the handling of a vehicle will be carefully taught and trained by an operating company. As soon as he is trained and begins to know something of the business, he aspires immediately to the taking of a private situation that will pay him from $10.00 to $15.00 a week more in wages. Hence it becomes very difficult to keep in service these men even though they are trained up to their duties for that particular purpose by the company itself. The third element which has acted very much against the commercial vehicle of today lies in the fact that any little derangement of the mechanism lays up the entire vehicle absolutely, thus rendering it useless for service. This entails not alone the loss of the chauffeur's wages, but also the loss of the earning power of the vehicle and the loss of interest on the investment. It also makes such a service very uncertain and inefficient, for when a vehicle is needed oftentimes expense does not enter into the matter at all but the actual use thereof is vital, and if this use is cut off abruptly by some slight derangement of the mechanism no excuse whatever will satisfy. In this connection it may be said that the slightest derangement sometimes requires hours, and in very many cases days, to locate. For instance, a little change of adjustment in the carbureter may require the time of a high grade mechanic three or four days to locate the trouble and to remedy it when found. The jumping off of a small spring, the disconnecting or breaking of a small wire, a little dirt getting into the gasolene, in fact any one of a thousand little things not alone can happen but do happen daily in the operation of all gasolene motor vehicles, and while in many cases these little derangements are found in a few minutes, yet fully one-half of them require several hours to locate and remedy. During such periods the vehicle manifestly is out of service and simply because of some minor derangement which in itself amounts to nothing. In case of a large delivery wagon, for example, which is heavily loaded with merchandise, if some slight derangement occurs on the road it is necessary to send out another vehicle and transfer the load from the damaged vehicle to the other. This not alone takes time, but oftentimes where vehicles are loaded with delicate goods they are damaged by a second handling.

Now, to take up the discussion of the first difficulty, as above outlined; i. e., wear and tear: there is no reason whatever why a motor vehicle engine and mechanism should not last at least as long as any similar piece of stationary mechanism; but, as a matter of fact, the very superior workmanship and material which are employed at the present time on nearly all motor vehicles should, by rights, entitle the motor vehicle power plant to a longer life than is being obtained in like stationary plants. There are only two real reasons why the motor vehicle power plant does not last and these reasons are:—first, because it is impossible with the present arrangement of parts in all gasolene and analogous motor vehicles to keep them clean or free from dirt and grit, and this dirt or grit which creeps in from the road settles on the oiled working parts and becomes a grinding or abrasive compound which soon eats out and wears them away. Second, their rapid deterioration is due to the fact that in the hands of an ordinary chauffeur they do not receive the necessary lubrication when and where they should. In this connection, due to years of experience with motor vehicles, I can say truthfully that it requires at least 12 hours to thoroughly clean and oil the mechanism of a modern gasolene motor vehicle for every 12 hours that it runs upon the road. By this I mean that if the mechanism of a motor vehicle is not cared for and kept scrupulously clean and thoroughly oiled the above stated condition of affairs does and must exist. I am also prepared to state that there is probably not one automobile in operation today that has even a fair percentage of this care and, consequently, the enormous depreciation above referred to must of necessity follow. This condition of affairs exists because of the inaccessibility of the working parts to the mechanic who has charge. Even though he be a painstaking and willing man it is asking too much of him to remove the pan from underneath, take off the fenders at the side and climb around inside of the mechanism in order to place drops of oil on all the little working parts that require it and particularly those that cannot be readily reached by the oil can. To illustrate my statement:—if the hood of any motor vehicle selected at random be lifted and one's finger drawn over any of the working parts, enough grit and grinding material will be removed on the tip of the finger to scratch glass or any other hard material therewith. If this state of affairs existed upon the mechanism of an ocean liner or upon any other fine piece of mechanism working indoors, such as an electric lighting engine, it would be quickly remedied by the discharge of the engineer and the employment of a competent substitute; but with the motor vehicle, even the most competent men cannot keep them absolutely free from this grit and dirt and, consequently, the mechanism suffers. Another element of importance is found in this that it is unjust to ask the operator of a motor vehicle to keep it clean and oiled. These men are on the road in wind, sun, rain, sleet and snow, and when they come in from a hard day's work they certainly do not feel like giving the immediate necessary amount of time to the care of the mechanism. With existing types of motor vehicles, however, it is absolutely necessary to allow the operator to take care of his own vehicle, as none of these men will tolerate any other person touching his machine, as they claim it is always thrown out of adjustment and gives trouble due to such outside attention, and the operator or chauffeur is not only required to run his vehicle, but to take care of it and do everything about it, with the exception of its actual adjustment and the washing of the body. Oiling and keeping it clean are always his province.

Now to discuss the elimination of the semi-skilled mechanic, as a chauffeur. I believe that the only way in which he can be eliminated is by having his work done in the shop by another class of men who are really skilled, and then to seal up or close the mechanism in such a way that the operator cannot get at it, and to put in his hands only the steering wheel and such levers or other accessories as are necessary for the operation of the vehicle itself. In other words, create a class of men somewhat on the order of the operators of electric cabs or street cars who simply know how to steer the car and how to apply and take off the power, and who know absolutely nothing else in regard to the mechanism, its care, adjustment, etc. If, therefore, we can create a class of men of such character and ability as to operate a modified form of power impelled vehicle, it instantly removes from the field the chauffeurs who are such a constant source of annoyance, and substitute for them a class of men easy to obtain at any time and, in any event, a class of men who can be trained up to their work in a few days and when trained will be efficient.

Now, as to the derangements, the only way to prevent a slight derangement from putting an entire car out of business is to be able to remove the entire mechanism from the car and substitute a new mechanism therefor and do the repairing outside of the car itself. The vehicle of today, as used throughout the entire world, consists of a chassis or frame on which is mounted the engine, which is securely bolted to it. The radiator or cooling apparatus is also bolted to this frame in another place and the oiling mechanism is bolted to the dash, which is in turn fastened to this frame; or, it is fastened to the frame directly. It is also a fact that in a majority of the modern automobiles a portion of the igniting apparatus is fastened to this frame on the running boards or elsewhere. The controlling levers are fastened to the frame and connected up by links to the parts which they control. The steering wheel is also fastened to the frame and is connected up by links to the forward wheels. The gasolene tank, as a rule, is fastened in the body under the forward seats; or, in some cases, is fastened in the rear of the chassis and secured to the frame itself. It is manifest, therefore, that if it is desired to remove the engine, for example from the chassis, it is necessary to release numbers of bolts and nuts, disconnect gasolene and electrical connections, all of the operating apparatus, all of the water cooling apparatus, etc., before the engine can be taken out. It requires from a half to a full day to remove an engine, and at least the same amount of time to replace it, providing nothing whatever be done to it. It also requires a similar amount of time and labor to remove the transmission. All of the links and levers must be disconnected, all of the bolts taken out which secure it to the frame, and it is considered in any shop a two or three days' job to take out a transmission and put it back. Another element which enters into the matter is the fact that the mere act of removing a transmission or an engine and putting it back again requires the utmost skill to replace the elements and line them correcting, so that they will operate freely and without friction, as each one of these various elements works independently of every other element and has to be in a certain perfect ratio with the other elements in order to work at all. It is for this reason that all minor repairs of every sort must be and are, as a matter of fact, made on the car itself in the assembled form, rather than by removing these pieces and doing the repair work on them outside and putting them back. It would be much more desirable in case of trouble to be able to remove these elements, do the repair work on them and put them back in place, than to attempt to do the work while they are in position; but it is due to the above enumerated difficulties that it is found impractical.

My invention consists broadly in combining all the necessary individual elements so as to form a complete power battery in one unit which I term a "power unit," and in mounting this unit on a base or frame by itself which is all lined up perfectly and in working order, and which can in itself be operated outside of the vehicle frame as well as when mounted thereon, and then so arrange this base or frame that it can be slipped in and slipped out of the motor vehicle frame with such ready ease that it will take only a few moments to withdraw the entire power unit from the vehicle and slip in another clean and adjusted power unit and send the vehicle out on the road to perform its work. The power unit which has given trouble and has been removed for care and attention can then be sent to the shop where it will receive the care of a skilled mechanic, and when repaired and put in first class condition it is put on the shelf ready for substitution in some other vehicle frame. I mean by a "complete power unit," the engine proper, the entire oiling system, the entire electrical system, the entire cooling system, including the radiator, pump, piping, etc.; the entire gasolene system including the vaporizer, the supply tank, etc.; the entire transmission, including the changes of gear—all mounted on one bed-plate so that by withdrawing this power unit from a car it can be set on a base or frame outside of the car itself, and by simply starting it up it will run just as well outside as it will inside, and after cleaning, repairing and adjustment it can be slipped back again in a few moments and the vehicle be ready for the road. By such an arrangement it must be very apparent what the result would be. In the first place, it will be impossible to put a vehicle out of service for more than a few minutes, as another complete, efficient, power unit can be substituted for the inefficient one within two or three minutes and the vehicle be on the street once more and able to earn dividends. Another important feature is that the entire power unit having been removed in this way can be run and tested and adjusted as a whole outside of the vehicle; and that when it is put in perfect condition—and not until then—is it put into the vehicle for service, and no tinkering or experimenting of any kind is necessary when it is once placed in the vehicle. A further important advantage lies in the fact that when the entire mechanism is withdrawn in this way it can be put on a special holder or table in an open room having the best possible natural and artificial light capacity so that it can be scrupulously examined and cleaned as to every detail and properly oiled, adjusted, and taken care of by competent men. Therefore, it is apparent that the efficiency and life of a piece of mechanism which receives such care at regular and specified intervals will be vastly greater than is the case with modern methods. I also prefer to so arrange the engine that the entire mechanism is inclosed in a metallic case, and this metallic case sealed in such a way that it can not be opened without the knowledge of the foreman, or other authorized person. I remove the power units from the vehicles at regular intervals—say twice a week—substituting other power units, sending the removed units to the shop to be examined, repaired, cleaned, oiled and readjusted. The cases are then sealed up with lead seals, having the date, and the number of the man who has given this particular unit attention stamped thereon. The casing may be provided with pad-locks, the keys for which are accessible only to the proper person or persons in the garage or shop where the repairs are to be effected. Still another very important consideration which presents itself is found in the fact that if a mechanism is given careful attention at regular specific intervals for example once or twice a week, the mechanism receiving this careful expert attention is not nearly so apt to get out of order and become deranged as a mechanism which is inaccessible and which is being taken care of by an ignorant chauffeur, and being slighted, because he is tired or unwilling and because no check can be made upon his work.

From the above outline it must be very apparent that with my improved detachable power unit the chauffeur or operator plays a very small part in the operation of a car, as the only thing which he is required to do is to steer the car, apply the power to start, and shut off the power and put on his brakes to stop, and in case of trouble telephone to headquarters.

I maintain that with my improvement I would practically multiply the life of a power unit by ten; that the possibility of trouble on the road would be almost eliminated, because of the regular and uniform attention which the mechanism would receive; that all of the power units would be adjusted alike and would give equal and uniformly satisfactory results because they would be adjusted and tested by a certain coterie of men who would be trained and expert in their work and responsible therefor, as before the power units would be put into actual service they would have to undergo certain tests in the shop which would prove their efficiency and their economy. I maintain that it would be practically impossible to keep such a car off the road and stop its earning capacity for more than a few minutes at any one time, only just long enough to make the substitution of a new power unit, and that because of the fact that none of the cars themselves would have to be in the shop or laid up they would show greatly increased earning capacity on the road.

An additional feature of my improvement which is important lies in the fact that it is possible to mount power units of different degrees of power on the same sized frame, and to slip in or substitute, for example, a higher powered unit for a lower powdered unit, or vice versa. For instance, supposing we need in the car service a 10 H. P. unit for city use and a 25 H. P. unit for country use. It is an easy matter to make the chassis, the wheels, the axles, etc., of sufficient strength to withstand the strain of the 25 H. P. unit, and to make up a 25 H. P. unit and a 10 H. P. unit on the same sized frame so that a large or a small power unit can be slipped into place as the case demands. Under conditions of this nature where the power unit is being used it will be preferable to have the inclosing casing under lock and key, the key to be held always by the owner or lessee of the vehicle. Under such conditions also it would be advisable to provide a detachable extension in the nature of rails and adjustable legs, and means such as a rack pinion and power shaft under the bottom of the base by which the power unit could be easily removed from the body of the vehicle and rest with one end thereon and the other upon the detachable extension. If it is found necessary to send a cab into the country, in five minutes a 25 H. P. unit may be slipped into place. When it comes back and goes into city use a 10 H. P. unit may be substituted. For pleasure vehicles an owner might have two such interchangeable units, one for city use and one for touring. With my improvement it is possible for one to select any preferred running gear, steering gear and body for a pleasure or touring vehicle and to retain the same from year to year, substituting each year, if he so chooses, any improved form of power unit for that last used, the invention in fact enabling him to utilize not only the advanced improvements of power units of the make originally selected by him, but of such other manufacturer as he may choose to elect, thereby materially decreasing the total expense from year to year, it being a well known fact that with existing types of motor vehicles the change of types of power units and car structures generally necessitates the sale of the entire vehicle when one desires to take advantage of the up to date improvements made in the driving motors. It is further to be noted that the feature of substituting a power unit of lower capacity in the city for that used in the country makes it possible to greatly reduce the cost of the fuel used in explosive engines, by reason of the fact that it is well understood that with such engines which are kept running constantly the amount of the explosive fuel is the same whether running with light loads or with heavy loads, this feature alone being a point of great importance in the running expenses of such vehicles in cities where relatively smaller power units are sufficient. In this way the greatest degree of efficiency is always obtainable.

Still another important feature lies in the ability to place the power unit in the most inaccessible place—such as under the front seat or the like—where it cannot be reached while in place, this being possible because no repairs or adjustments are ever attempted except by removing the entire power unit and doing the work outside. By stowing away the power unit as above suggested a more compact and shorter wheelbase car can be obtained which is very desirable for cars used in the city where streets are narrow and where turning and maneuvering capacity is essential.

Referring now to the drawings for a full and clear understanding of my invention, such as will enable others skilled in the art to construct and use the same, Figure 1 is an elevational view of a gasolene motor vehicle of the coach type, a part thereof being broken away so as to show the interior structure of the power unit as applied thereto in my improvement, parts of the power unit sustaining mechanism and the permanent protecting casing thereover being shown in sectional view, the lever which controls the transmission gear being shown in dotted lines. Fig. 2 is an end elevational view as seen looking at Fig. 1 from left to right, the power unit, however, being removed in this view, the radiator being shown in elevational view in its position against the dash-board in dotted lines, the controlling levers and steering shaft in position also in dotted lines, with the handle of one of the controlling levers, the steering wheel and the upper end of its shaft in full lines. Fig. 3 is a bottom plan view of the main frame, wheels, axles, driving shaft, driving gear case and steering mechanism and interconnected parts of the motor vehicle shown in Fig. 1, the steering wheel being shown in dotted lines and my improved means for detachably supporting the power unit as applied to the vehicle in full lines. Fig. 4 is a sectional view taken through the power unit sustaining mechanism on the line X—X Fig. 3 and as seen looking thereat from the bottom toward the top of the drawings, the steering mechanism, front axle and front wheels, however, not being shown in this view. Fig. 5 is a transverse sectional view taken through Fig. 4 on the line Y—Y and as seen looking thereat from right to left in the direction of the arrows, upon the supposition that the complete sub-frame is illustrated in Fig. 4. Fig. 6 is a side elevational view of the complete power unit as assembled on a single base ready to be inserted into the position shown in Fig. 1. Fig. 7 is an end elevational view as seen looking at Fig. 6 from right to left in the direction of the arrows, the inclosing casing, however, for protecting the power unit being shown in sectional view. Fig. 8 is an elevational view similar to Fig. 6 of the reverse side of the power unit seen in that figure. Fig. 9 is an end elevational view of Fig. 8 as seen looking thereat from right to left in the direction of the arrows, all of Figs. 6, 7, 8 and 9 being enlarged views as compared with the corresponding parts, in so far as they are illustrated in Fig. 1.

Referring now to the drawings in detail, in all of which like numerals represent like parts wherever used, 1 represents the body of the vehicle mounted upon a main frame 2 embracing two side bars interconnected in the manner shown in Fig. 3, said side bars being provided with the usual cross connecting bars and braces, the chassis being supported directly upon the axles by springs in a well known manner, as clearly illustrated in Figs. 1 and 3.

3 represents, wherever used upon the drawings, what I term the "power unit" and consists broadly speaking of all of those parts of a motor vehicle which are intimately related with the transmission of the power to the driving shafting, the same being so interrelated in my improvement and so connected to a common supporting base or frame as to be of the most compact form, as clearly illustrated in Figs. 6, 7, 8 and 9. This power unit is supported directly by two sub-frames illustrated in Figs. 1, 3, 4 and 5 by the numerals 4 and 5, these numerals indicating, wherever used through the specification, the complete sub-frames embracing elements which will be described later on, said sub-frames being adapted to be fastened to the main frame 2.

6 represents the rear axle to which power is transmitted in the usual way through a pair of bevel-gears, known as driving gear, inclosed in a gear-case 7. Universal and slip joints of the usual type are shown at 8, to which joints is connected a driving shaft 9 and a second universal joint 10, which universal joint is connected in turn to a horizontally disposed shaft 11 suspended in turn in a bearing 12 bolted or otherwise secured as shown directly to the side bars of the frame 2. To the inner end of the shaft 11 is secured a female half 13 of a slip or separable coupling, designed to effect the coupling between the parts already described and the power unit 3, when the latter is slipped into place, as will be described later on. The male part 14 of this coupling constitutes a part of the power unit 3 and is clearly shown in Figs. 1, 6, 7 and 8. The front axle 15 is attached to the frame 2 by springs 16 in the usual way; the center of said axle being bowed down, as shown at 17 (see Fig. 1) in order to allow the power unit to pass thereover when slipped into position on the supporting frames. The steering gear is of the usual form, consisting of knuckles and links adapted to be operated by a steering wheel 18, said steering gear being secured permanently to the frame 2 in the usual manner and to one side of the power unit when the latter is slipped into position.

Referring now particularly to Figs. 6 to 9 inclusive, I will describe the power unit which embraces in the present instance a base 19 having mounted thereon and secured thereto any number of cylinders 20, four such cylinders being shown. These cylinders may be bolted directly to the base 19, or they may be cast integral therewith if so desired. They are fitted with the usual inlet valves 21, 21, 21, 21 and exhaust valves 22, 22, 22, 22, four such sets of valves being shown on opposite sides for clearness (see particularly Figs. 6 and 8). The cylinders are provided with the usual water-jackets surrounding their upper ends, which jackets are fed by a pump 23 mechanically driven by a shaft 24 connected to a gear-wheel in a gear-case 25 and operatively connected through gearing in the usual way with the main driving shaft 26. The same gear-wheel which drives the pump 23 operates through a cam shaft the valve 22 in the usual way, said camshaft, however, not being shown. The pump 23 is connected on its induction side through a pipe directly with the interior of the radiator chamber 27 and at its bottom as shown, and on its eduction side through a pipe 28 and branch pipes 29, 29 with the water-jackets, said water jackets being connected in turn through enlarged branch pipes 30 and a continuation 31 thereof directly to the upper end of the radiator chamber as shown, so that the water after it has circulated over the cylinders is returned in the usual manner in its heated condition to the top of the radiator chamber and again subjected to the cooling influence of the radiator which is of well known form, that shown being preferably of the cellular type which allows the water to pass through openings 33 so that it is cooled on its downward passage through these cells. For the purpose of accelerating the passage of the air through the radiator the fly-wheel 34 has a fan or vanes cast directly into the web thereof and is located preferably between the engine base and the radiator 27, as shown, although a fan may be driven by the usual belt and gear appliance, as is customary in vehicles of this type. I prefer to locate the fly-wheel between the engine proper and the radiator as shown in the drawings, for the purpose of enabling me to attach the transmission case which incloses the transmission gear to the other end of the engine base, as will be described later on. The casing for the transmission gearing is illustrated as connected to the opposite end of the base 19 by the numeral 35. 36 represents the carbureter of any of the preferred forms in general use. The gasolene is supplied to the carbureter through the pipe 37 operatively connected at the lower end of the gas tank 38 supported in any convenient place upon the base 19, preferably, however, directly over the transmission case 35 as shown. The gaseous mixture is supplied to the cylinders in the usual way through the pipe system 39 and controlled by a throttle valve 40 which is operated by a lever 41 adapted to be detachably secured in a socket 42 at its lower end, for the purpose of preventing said lever from interfering with the removal of the power unit from the vehicle. 43 represents the oiler which is driven by a shaft 44 connected with the distributing gearing in the gear-case 25, said oiler being connected by oil pipes 45, 45, directly to the cylinders and other parts to be oiled in the usual way. A gravity feed oiler or any type of oiler may be used, if desired, but I prefer to use a strictly mechanically driven oiler for the reason that with such an arrangement the oil is utilized only while the engine is actually in motion; while with the gravity feed oiler it becomes necessary to open and close by hand, and inasmuch as my invention contemplates the sealing up of the unit for a definite time it will be appreciated that it is important that the oiler should be of the mechanical feed type; but, as before stated, any type of oiler may be utilized. 46 is the magneto machine for effecting the ignition in the cylinders, said machine being secured by bolts or in any preferred manner directly to the base 19 upon a base 47 and it is driven by a shaft 48 connected to the shaft 24 which drives the pump 23. This magneto might be located elsewhere on the frame if preferred, so long as it is mechanically driven by the distributing gears inclosed in the gear-case 25. I prefer, however, to attach the magneto directly to the unit in the manner described for reasons hereinbefore indicated as to the maintaining of all of the parts of the unit strictly inclosed and out of disturbing influences, dust, dirt, grit and moisture. An electric battery could be substituted for the magneto if desired and mounted similarly. The conductors from the magneto are indicated by the numerals 49, 49, 49, 49 and are connected directly to the sparking plugs at the upper end of the cylinders, as shown, and grounded through the frame in the well known manner. The exhaust gases are conveyed from the engine through the exhaust valves 22 into a breeching pipe 50 which in turn is connected to an exhaust pipe 51 adapted to convey said gases to the open air.

It will now be appreciated that I have described an operative hydrocarbon engine with accessories embracing a complete ignition system, a complete cooling system and a complete oiling system, and that all of these accessories are mounted or assembled in the most compact form directly upon a single base 19 which constitutes the base of the power unit proper. The pistons of the several cylinders 20 are connected in the usual way to the main crank shaft 26 journaled in the base 19 on one end of which, as before stated, is secured the fly-wheel 34, the other end thereof being journaled in the base at a point near the transmission gear-case 35 and adapted to be connected in the usual way through the usual forms of transmission gear to a shaft 54, 53 being the operating lever for effecting the variations in transmission speed, said lever being secured to the transmission gear at the point 55 in the usual way and provided with a socket 56 from which the lever 53 may be removed for the same purpose as was described in connection with the controlling lever 41. The transmission gear inclosed in the casing 35 is preferably of the well known planetary type which is adapted to be operated by the lever 53 in a well known manner, though the clash or sliding gear type may be used if desired, for the purpose of obtaining variable speeds and variation in direction of movement, all such matters being well within the skill of those versed in the art. My purpose, therefore, being to provide a power unit which is of a very compact form and to secure all of the individual accessories or elements thereof to a single base so that the same may be slipped into position in the frame 2 of a motor vehicle or removed therefrom as desired, I prefer to construct the base 19 of one integral metal part having flanges 57 located on either side, as clearly shown in Figs. 6, 7, and 8. These flanges preferably extend the entire length of the engine base and although I prefer to make them integral therewith, they might obviously be supplanted by lugs cast integral with the base and provided with detachable metallic flanges secured thereto by screws or bolts, or in any preferred manner. An examination of Figs. 6 and 7 of the drawings discloses the fact that inasmuch as the radiator chamber 27 and the case of the fly-wheel 34 require more vertical space than the body of the engine proper it becomes necessary to provide a downward extension for the flanges and such extension 58 is therefore cast integral therewith, a pair of flanges 59 being cast integral with said extension 58 and similar in all respects to the flanges 57. 60, 60, 60 are side lugs on the opposite sides of the engine base and downward extension 58, the same constituting means for alining the power unit upon the sub-frames or supports 4 and 5. It will be understood, therefore, that the flanges 57, 57, 59, 59 located on opposite sides of the engine base and downward extension 58 thereof constitute the means of support for the entire power unit which is to be sustained by the sub-frames 4 and 5 which I will now describe, reference being had particularly to Figs. 3, 4, and 5 of the drawings. These sub-frames embrace each two yoke-shaped members and two horizontal stringers as follows: the frame 4, yoke shaped members 61, 61 and horizontal stringers 62, 62; and the frame 5, yoke-shaped members 63, 63 and horizontal stringers 64, 64, and said frames are independent of each other and provided at their upper ends with angular extensions adapted to bear respectively upon the tops and against the inner faces of the side bars of the main frame 2, 2, and to be secured thereto in any preferred manner, preferably by bolts, so that when the frames are put together and secured thereto in the manner indicated in Fig. 3 of the drawings they are in position to receive the power unit.

Referring again to Figs. 6 and 7 it will be seen that the outer ends 65, 65, 66, 66, of the flanges 57 and 59 are cast of wedge-shape construction on their upper sides, the inclinations being in opposite directions. It will also be seen on inspection of Figs. 3 and 4 that the outer ends of the stringers 62, 62, 64, 64 are provided respectively with angle irons 67, 67, 68, 68, the angular inclinations of said angle irons being the same as that of the wedged ends 65, 65, 66, 66, and said angle irons are made detachable by the use of bolts 69, 69 and 70, 70, although the inner set of angle irons 67, 67, might be integral with the horizontal stringers 62, 62, if preferred the functions of these several angle irons and wedges and side lugs 60, 60 being to aline and securely hold the power unit after it has been slipped into its operative position.

To the upper ends of the cylinders or to any preferred accessible part of the base 19 are detachably secured one or more ring bolts or eyes as shown in the drawings, the function of the same being to lift the power unit by a crane or other source of power when removing or putting it in place. These ring bolts would, of course, be detached when the power unit is in use and carried in the tool-box.

72 is a moisture and dust tight cover or case, preferably of sheet metal, which entirely incloses or surrounds all of the operative parts of the power unit, rendering it absolutely secure against the admission of dust, dirt, grit or moisture, and preventing any one from tampering with the mechanism. This cover is provided with seals or locks 73, 73 and after the power unit has been thoroughly examined, cleaned and tested at the garage the cover is put on and it is sealed or locked and a card secured in the seals indicating the time of the test and the name of the employee who cleaned, adjusted and tested it. The unit is now ready for insertion in its place in the frame of the vehicle proper.

Referring now to Fig. 2, 74 represents an opening in the dash-board 75 through which the upper portion of the power unit is to be inserted. 76 (Fig. 1) is a permanent case having the contour of the opening 74 in the dash-board, connected thereto as shown at 77, and extending from said dash-board rearwardly to and beneath the front seat 78. This permanent case is provided with a slot 79 through which the throttle lever 41 may be inserted and withdrawn. A similar slot, not shown, is provided in the casing for the gear-shifting lever 53. The power unit is slipped into position by an endwise movement from a table, runway or support, or from any desirable supporting means for such handling, either with a power impelled crane or other source of power, the flanges 57, 57, and 59, 59 being slipped over the stringers 62, 62, 64, 64, the friction between said parts being lessened with oil, if preferred; or, if desired, friction rollers may be journaled in the stringers 62, 62 and 64, 64. As the power unit is thus moved into position the male part 14 of the coupling on the shaft 54 is connected with the female part 13 on the shaft 11, said shafting being in perfect horizontal alinement. After the power unit is thus placed in position with the wedge-end 65, 65 bearing against the angle irons 67, 67, the angle irons 68, 68 are secured in position with the bolts 70, 70, thus firmly and rigidly securing the entire power unit in place with the rear face of the radiator chamber resting directly against the dash-board, as shown in dotted lines Fig. 2 and in full lines Fig. 1. The levers 41 and 53 are now inserted in their sockets through the slots in the case 76 and all is ready for action. The operator simply has control of the motor vehicle through the agency of the levers 53 and 41 and steering gear-wheel 18 as all of the essential parts of the controlling and operating mechanism are, as hereinbefore described and illustrated in the drawings, wholly inaccessible to him.

I do not limit my improvement to the especial details of construction shown in the accompanying drawings and hereinbefore described, as many of the individual features thereof may be materially departed from and still come within the scope of my claims hereinafter made. To illustrate, although I have disclosed a well known form of gasolene engine with the accompanying accessories or attachments in the nature of an automatic oiler, automatic sparking mechanism—as a magneto generator—a radiator, a power impelled pump, and have described a planetary power transmitting system all connected to and carried by a single base, and have assembled the same in a compact and single power unit, these features may be materially departed from individually and still come within the terms of my claims; that is to say, although I have assembled these individual features in a thoroughly practical way on a single base and provided the same with means for covering them up from the action of dust, dirt, grit and moisture, other structural devices may be substituted therefor within the skill of those versed in the art. Or, if preferred, some of the individual accessories or elements of this complete power unit might be secured directly to the main frame. The magneto generator might be permanently connected with the frame and exterior to the inclosing casing and the conductors inclosed in an insulating cable and connected at their free ends to a multiple plug connector secured directly to the detachable engine base and inside said casing; or, the oiler might be so located and connected by detachable flexible tubes to a similar connector on the engine base and inside the casing; or, a battery and induction coil might be substituted for the generator and secured directly to the main frame exterior to the power unit system proper and the necessary multiple connections effected to the sparking plugs through switch plug attachments.

Another important feature of my invention lies in thoroughly protecting the moving parts of the power unit which are subjected continuously to friction and the deteriorating influences of dust, dirt or grit, and such variations as suggested might be made without avoiding what I consider the material feature; to wit, the protection of the engine or motor proper, whether the same be propelled by explosive gases, steam, electricity, compressed air, or other source of energy, necessitating the employment of rotary, oscillatory, or reciprocating parts which necessarily are subjected to serious mechanical wear by the presence of dust, grit, dirt and moisture, or which necessarily require frequent inspection and treatment.

The manner of supporting the power unit also upon two sub-frames while being adapted for use generally with existing types of motor vehicles might be materially departed from and the entire unit might be sustained directly upon the main frame itself were the frame so built as to admit of this manner of sustaining it. In other words, it is of course obvious that the frame 2 might be so constructed as to admit of detachably sustaining the particular form of power unit which I have described and shown and still come within the scope of my claims. Or, the power unit proper might be of such a structural nature as to be detachably supported directly by the frame itself without the intervention of intermediate frames, the essence of my invention lying generally in the effecting of the many beneficial results which follow from the separating of the entire power unit from the body of the vehicle proper when it is desired to inspect, clean, repair and adjust it. It is also apparent that the manner of and means for suspending or supporting the power unit might be materially departed from and still come within the scope of my claims; to illustrate, in case of vehicles having the motor shaft parallel with the wheels and axles thereof and in which the power is transmitted either by gear transmission or by sprocket wheels and chains, such power unit may be sustained beneath the frame and removed laterally or sidewise. Or, in other cases, it might be removed from the rear of the chassis or frame, either when supported above or below the same. Nor do I limit the use of my invention, in the nature of complete compact power unit connected to a single base and provided with the especial qualifications hereinbefore enumerated, to use with wheeled motor vehicles of the automobile type, as obviously the same may be used with tram cars or with sleighs, or with motor boats; or in any place in the utilization of energy where it is found desirable to maintain practically perfect service and efficiency from power motors of the explosive type.

I am aware that it has heretofore been proposed to support a power unit upon a motor vehicle in a supplemental frame, which supplemental frame is in turn detachably secured upon the side bars of the main frame, and in such manner that the same may be wholly removed from the vehicle for repairs, as disclosed in U. S. patent to Darnstaedt No. 773,480 of Oct. 25th, 1904, and I am also aware that it has heretofore been proposed to secure a power unit beneath the frame of a motor vehicle upon a single tube or rod arranged transverse to the frame, in such manner that the unit as a whole may be removed from the vehicle for repairs, as disclosed in U. S. patent to Dyer No. 676,223, of June 11th, 1901, and I make no claim hereinafter broad enough to include either of such structures, my most generic claim being directed to the adaptation of complete interchangeable power units upon a motor vehicle and in such manner as to make it possible to use the unit irrespective of the vehicle whereby I obtain the numerous points of advantage hereinbefore disclosed, and I wish it understood that my claims are to be limited especially to this feature of interchangeability as contradistinguished from the simple removal of a power unit for the purpose of repairing it, my novel improvement making it possible to greatly enhance the value of a plant of vehicles provided with interchangeable power units sustained each by a standardized base which adapts them to be substituted one for the other, whether of the same or different power capacity, or of the same or different manufacture, such a scheme materially adding to the value of the output of a plant, or even of an individual private motor car where the same is utilized to a large extent, either locally or in touring.

I am not aware that anyone has, prior to my invention, devised a complete power unit and all of its accessories operative as a whole, either on a motor vehicle or when detached therefrom and supported by a rigid base and the entire arrangement such that by virtue of such rigid base it is possible to always maintain all of the operative parts of the power unit in a definite or fixed relation to each other whereby the best mechanical results are attained, and this feature of utility is one of the most important flowing from my invention.

Having thus described my invention what I claim and desire to secure by Letters Patent of the United States is—

1. A motor vehicle embracing wheels and axles and a frame therefor; in combination with a section of driving shafting geared to the rear wheels and journaled at its front end in a bearing sustained by the frame; together with a power unit embracing a motor and all of the necessary operative accessories supported upon a common rigid base, said power unit and base being detachable as a whole from the vehicle and provided with means for detachably connecting the motor to the driving shaft, substantially as described.

2. A motor vehicle embracing wheels and axles, a frame therefor, and driving gear; in combination with a power unit supported by a base, said base being detachably and slidably sustained upon the frame; together with a slip or separable coupling between the power unit and the driving gear which transmits the power from the unit to the wheels, the entire arrangement being such that the power unit as a whole may be removed and that the act of such removal severs the connection between said power unit and the driving gear, substantially as described.

3. A motor vehicle embracing wheels and axles and a frame therefor; a motor and a sustaining base for such motor, said base being provided at its sides with supporting means for removably sustaining it upon the frame in such manner that it may be moved endwise in the direction of the length of the vehicle; in combination with means for so connecting the motor to the driving wheels of the vehicle that the act of removing the motor and its sustaining base effects disconnection between it and said driving wheels, substantially as described.

4. A motor vehicle embracing wheels and axles and a frame therefor; in combination with a motor sustained by a base provided with two or more lateral or side supports adapted to be sustained by the frame and in such manner that said motor and its base may be moved bodily in the direction of the length of the frame; together with means for detachably connecting the motor shaft to the driving wheels of the vehicle by the act of withdrawing the motor from the frame, substantially as described.

5. A motor vehicle embracing wheels and axles and a frame therefor; a motor supported by a base provided with slidable supporting means at its opposite sides; together with means for effecting its alinement in the direction of the length of the frame; in combination with means for detachably effecting interconnection between the driving shaft of the motor and the shaft which connects the same to the driving wheels by the act of withdrawing the motor from the frame, substantially as described.

6. A motor vehicle embracing wheels and axles and a frame therefor; in combination with an explosive engine; accessories, in the nature of a fuel supply tank, a carbureter and interconnections with the engine; a source of electrical energy and interconnections with the cylinder or cylinders of the engine, a radiator and water cooling connections between said radiator and water-jackets surrounding said cylinder or cylinders, an oiler operatively connected with the various parts of the engine which require oiling, and driving mechanism therefor; a driving shaft operatively connected with the engine and transmission means and gearing and a fan or cooling means, the motive parts of all of said accessories being connected to the driving shaft of the engine, said engine and said accessories being all fixedly secured to a common base which is provided with means for detachably securing it in turn to the frame of the vehicle, the arrangement being such that the base may be slipped into position and interconnections between the engine and the driving wheels thereof effected, substantially as described.

7. A motor vehicle embracing wheels and axles and a frame therefor; a motor and accessories, said motor and accessories being carried by a rigid base slidingly and detachably secured in turn to the frame; in combination with a protecting case for the motor and accessories and means for locking or sealing said case so as to prevent unauthorized persons from tampering therewith, substantially as described.

8. A power unit for use with motor vehicles embracing a motor and operative accessories therefor, all secured to a rigid base which is provided with means for detachably securing it in turn to the frame of a vehicle; in combination with a casing adapted to inclose the motor and a part or all of the accessories; together with means for locking or sealing said casing so that unauthorized persons cannot tamper therewith, substantially as described.

9. A power unit for use with motor vehicles provided with driving wheels, embracing a motor and the necessary operative accessories therefor, all secured to a rigid base which is provided with means for detachably and slidingly securing it in turn to the frame of a vehicle; a motor shaft; a transmission shaft which is geared to the driving wheels, and means for effecting the alinement of said shaft, substantially as described.

10. A power unit for use with motor vehicles embracing a motor and operative accessories therefor, all secured to a rigid base which is provided with side alining lugs 60, 60; together with means for detachably securing said base in proper alinement with the frame of the vehicle, substantially as described.

11. A power unit for use with motor vehicles embracing an explosive engine and operative accessories; a transmission gear system operatively connected to the motor shaft, said motor, its accessories and said transmission gear being supported by a rigid base; in combination with a frame; together with means for detachably and slidingly securing said power unit to the frame, and means for placing it in alinement therewith, substantially as described.

12. A power unit for use with motor vehicles embracing a motor and operative accessories in connection therewith, all supported by a rigid base which is provided with means for slidingly and detachably securing it to the frame of a vehicle, and additional means for utilizing applied power in removing or handling the unit, substantially as described.

13. A motor vehicle embracing wheels and axles and a frame therefor; in combination with a power unit slidably supported by a frame; a slip or separable coupling for detachably disconnecting the power unit from the driving wheels, the arrangement being such that said power unit may be removed as a whole by disconnecting it from the frame and sliding it from the vehicle, substantially as described.

14. In a motor vehicle a main frame and a sub-frame secured thereto and provided with longitudinal stringers; in combination with a motor and accessories secured to a rigid base which is provided with means for detachably securing it to the sub-frame, substantially as described.

15. In a motor vehicle a motor shaft; a main frame; a base; a journal and bearing; a driving shaft geared to one of the axles of the vehicle at one end and supported at its other end by a journal in a bearing, which bearing is in turn sustained by the frame; in combination with a power unit and accessories supported by the base which in turn is supported by the frame, the driving shaft being connected to the journal and it in turn detachably connected to the motor shaft, substantially as described.

16. In a motor vehicle a main frame and one or more sub-frames secured thereto and provided with longitudinal stringers; in combination with a base, a power unit and accessories supported by said base; together with means for slidably sustaining said power unit upon the stringers, substantially as described.

17. In a motor vehicle a main frame having side members; a base; a driving shaft 11; a power unit embracing a motor and the necessary coöperating accessories secured to the base which in turn is provided with means for slidingly sustaining it between said side members; together with means for effecting the alinement of the driving shaft of the motor with the aforesaid driving shaft 11, substantially as described.

18. A power unit for a motor vehicle embracing a motor and motive control appliances; a base for supporting all of said parts; in combination with means for slidingly attaching said base and the parts as a whole to the vehicle; together with detachable control devices or appliances, substantially as described.

19. In a motor vehicle a power unit embracing a motor and accessories; a base which supports said parts, and means for manually effecting the control of the motor; in combination with control devices adapted to be detachably secured to the respective control appliances; together with a removable casing or cover for protecting the parts of the power unit, the arrangement being such that said unit may be attached to and detached from the vehicle at will, substantially as described.

20. A motor vehicle embracing running gear; a frame; a body; a base; a dash-board with an opening; a detachable power unit carried by said base; together with means for detachably securing said base to the frame of the vehicle, the arrangement being such that said power unit is put in operative position by inserting it through the opening in the dash-board, substantially as described.

21. A motor vehicle chassis provided with a power unit; a dash-board having an opening therethrough of sufficient capacity to receive said unit; a permanent cover for the unit extending from the dash-board rearwardly a sufficient distance to cover it when secured in position, substantially as described.

22. A motor vehicle chassis; a body secured thereto and having a chauffeur's seat; a power unit; a dash-board provided with an opening of sufficient capacity to receive said unit; together with a permanent cover for said unit between the dash-board and the chauffeur's seat, substantially as described.

23. A motor vehicle chassis provided with a detachable power unit; a base for said power unit; a stationary protecting casing secured to the chassis; and a second protecting casing secured to the base which carries the power unit, substantially as described.

24. A rigid base; a power unit embracing a motor, a carbureter, an agitating device, and means for removing the surplus heat generated by the motor, all secured to said rigid base; a permanent base adapted in turn to slidingly support said power unit and the first-named base; mechanism for absorbing the power generated by the unit, said mechanism bearing a fixed relation to the permanent base, the rigid base and the permanent base being provided with coacting means for quick alinement of the power generating and the power absorbing parts, substantially as described.

25. A motor vehicle embracing wheels and axles and a frame therefor; in combination with an explosive engine and accessories in the nature of a fuel tank, a carbureter and interconnections with the engine, the motive parts of said accessories being connected to the driving shaft of the engine, said engine and said accessories being all fixedly secured to a rigid base which is provided with means for detachably securing it in turn to the frame of the vehicle, the arrangement being such that the base may be slipped into position and interconnections between the engine and the driving wheels thereof quickly and securely effected, substantially as described.

26. A motor vehicle embracing wheels and axles and a frame therefor; in combination with an explosive engine and accessories in the nature of a fuel tank, a carbureter and interconnections with the engine, a source of electrical energy and interconnections with the cylinder or cylinders of the engine, the motive parts of said accessories being connected to the driving shaft of the engine, said engine and said accessories being all fixedly secured to a rigid base which is provided with means for detachably securing it in turn to the frame of the vehicle, the arrangement being such that the base may be slipped into position and interconnections between the engine and the driving wheels thereof quickly and securely effected, substantially as described.

27. A motor vehicle embracing wheels and axles and a frame therefor; in combination with an explosive engine and accessories in the nature of a fuel tank, a carbureter and interconnections with the engine, a source of electrical energy and interconnections with the cylinder or cylinders of the engine, a radiator and water cooling connections between said radiator and water jackets surrounding said cylinder or cylinders, the motive parts of said accessories being connected to the driving shaft of the engine, said engine and said accessories being all fixedly secured to a rigid base which is provided with means for detachably securing it in turn to the frame of the vehicle, the arrangement being such that the base may be slipped into position and interconnections between the engine and the driving wheels thereof quickly and securely effected, substantially as described.

28. A motor vehicle embracing wheels and axles and a frame therefor; in combination with an explosive engine and accessories in the nature of a fuel tank, a carbureter and interconnections with the engine, a source of electrical energy and interconnections with the cylinder or cylinders of the engine, a radiator and water cooling connections between said radiator and water jackets surrounding said cylinder or cylinders, an oiler operatively connected with the various parts of the engine which require oiling, and driving mechanism therefor, the motive parts of said accessories being connected to the driving shaft of the engine, said engine and said accessories being all fixedly secured to a rigid base which is provided with means for detachably securing it in turn to the frame of the vehicle, the arrangement being such that the base may be slipped into position and interconnections between the engine and the driving wheels thereof quickly and securely effected, substantially as described.

29. A motor vehicle embracing wheels and axles and a frame therefor; in combination with an explosive engine and accessories in the nature of a fuel tank, a carbureter and interconnections with the engine, a source of electrical energy and interconnections with the cylinder or cylinders of the engine, a radiator and water cooling connections between said radiator and water jackets surrounding said cylinder or cylinders, an oiler arranged to lubricate the various parts of the engine which require oiling, a driving shaft connected with the engine through transmission means and gearing, the motive parts of said accessories being also connected to the driving shaft of the engine, said engine and said accessories being fixedly secured to a rigid base which is provided with means for detachably securing it in turn to the frame of the vehicle, the arrangement being such that the base may be slipped into position and interconnections between the engine and the driving wheels thereof quickly and securely effected, substantially as described.

30. A motor vehicle embracing wheels and axles and a frame therefor; in combination with an explosive engine and accessories in the nature of a fuel tank, a carbureter and interconnections with the engine, a source of electrical energy and interconnections with the cylinder or cylinders of the engine, a radiator and water cooling connections between said radiator and water jackets surrounding said cylinder or cylinders, an oiler operatively connected with the various parts of the engine which require oiling, and driving mechanism therefor, a driving shaft connected with the engine and transmission means and gearing, and a fan or cooling means; the motive parts of said accessories being connected to the driving shaft of the engine, said engine and said accessories being fixedly secured to a rigid base which is provided with means for detachably securing it in turn to the frame of the vehicle, the arrangement being such that the base may be slipped into position and interconnections between the engine and the driving wheels thereof quickly and securely effected, substantially as described.

31. In combination, the frame of a motor car, a transmission mechanism mounted thereon, a sub-frame, a motor mounted thereon, track members on the frame, runners on the sub-frame adapted to engage said track members, means whereby the motor and the transmission automatically engage.

32. In a motor vehicle, the combination of a main frame, a cross member toward the front of said main frame, longitudinal track members supported by said main frame, a movable sub-frame adapted to carry the motor mechanism and arranged to travel on said track members, said cross-member being bent in a vertical plane between its ends to permit the passage of said sub-frame and motor mechanism.

33. In a motor car, an engine adapted to be removed and replaced at the front by a substantially horizontal movement, said engine being provided with a shaft extending horizontally and longitudinally of said vehicle, said shaft being provided with one-half of a coupling, a transmission shaft provided with one-half of a coupling adapted to be engaged by the half of the coupling on the engine shaft, and means for supporting the transmission shaft in position to be engaged by the engine shaft.

In testimony whereof I have signed my name to this specification in the presence of two subscribing witnesses.

EDWARD B. GALLAHER.

Witnesses:
C. J. KINTNER,
L. C. BISPHAM.

Copies of this patent may be obtained for five cents each, by addressing the "Commissioner of Patents, Washington, D. C."

---

Corrections in Letters Patent No. 1,062,452.

It is hereby certified that in Letters Patent No. 1,062,452, granted May 20, 1913, upon the application of Edward B. Gallaher, of New York, N. Y., for an improvement in "Motor-Vehicles," errors appear in the printed specification requiring correction as follows: Page 3, line 113, for the word "correcting" read *correctly;* page 12, line 22, for the word "agitating" read *igniting;* and that the said Letters Patent should be read with these corrections therein that the same may conform to the record of the case in the Patent Office.

Signed and sealed this 18th day of November, A. D., 1913.

[SEAL.]

R. T. FRAZIER,

*Acting Commissioner of Patents.* with means for detachably securing it in turn to the frame of the vehicle, the arrangement being such that the base may be slipped into position and interconnections between the engine and the driving wheels thereof quickly and securely effected, substantially as described.

30. A motor vehicle embracing wheels and axles and a frame therefor; in combination with an explosive engine and accessories in the nature of a fuel tank, a carbureter and interconnections with the engine, a source of electrical energy and interconnections with the cylinder or cylinders of the engine, a radiator and water cooling connections between said radiator and water jackets surrounding said cylinder or cylinders, an oiler operatively connected with the various parts of the engine which require oiling, and driving mechanism therefor, a driving shaft connected with the engine and transmission means and gearing, and a fan or cooling means; the motive parts of said accessories being connected to the driving shaft of the engine, said engine and said accessories being fixedly secured to a rigid base which is provided with means for detachably securing it in turn to the frame of the vehicle, the arrangement being such that the base may be slipped into position and interconnections between the engine and the driving wheels thereof quickly and securely effected, substantially as described.

31. In combination, the frame of a motor car, a transmission mechanism mounted thereon, a sub-frame, a motor mounted thereon, track members on the frame, runners on the sub-frame adapted to engage said track members, means whereby the motor and the transmission automatically engage.

32. In a motor vehicle, the combination of a main frame, a cross member toward the front of said main frame, longitudinal track members supported by said main frame, a movable sub-frame adapted to carry the motor mechanism and arranged to travel on said track members, said cross-member being bent in a vertical plane between its ends to permit the passage of said sub-frame and motor mechanism.

33. In a motor car, an engine adapted to be removed and replaced at the front by a substantially horizontal movement, said engine being provided with a shaft extending horizontally and longitudinally of said vehicle, said shaft being provided with one-half of a coupling, a transmission shaft provided with one-half of a coupling adapted to be engaged by the half of the coupling on the engine shaft, and means for supporting the transmission shaft in position to be engaged by the engine shaft.

In testimony whereof I have signed my name to this specification in the presence of two subscribing witnesses.

EDWARD B. GALLAHER.

Witnesses:
C. J. KINTNER,
L. C. BISPHAM.

---

Copies of this patent may be obtained for five cents each, by addressing the "Commissioner of Patents, Washington, D. C."

---

Corrections in Letters Patent No. 1,062,452.

It is hereby certified that in Letters Patent No. 1,062,452, granted May 20, 1913, upon the application of Edward B. Gallaher, of New York, N. Y., for an improvement in "Motor-Vehicles," errors appear in the printed specification requiring correction as follows: Page 3, line 113, for the word "correcting" read *correctly;* page 12, line 22, for the word "agitating" read *igniting;* and that the said Letters Patent should be read with these corrections therein that the same may conform to the record of the case in the Patent Office.

Signed and sealed this 18th day of November, A. D., 1913.

[SEAL.]

R. T. FRAZIER,

*Acting Commissioner of Patents.*

Corrections in Letters Patent No. 1,062,452.

It is hereby certified that in Letters Patent No. 1,062,452, granted May 20, 1913, upon the application of Edward B. Gallaher, of New York, N. Y., for an improvement in "Motor-Vehicles," errors appear in the printed pecification requiring correction as follows: Page 3, line 113, for the word "correcting" read *correctly;* page 12, line 22, for the word "agitating" read *igniting;* and that the said Letters Patent should be read with these corrections therein that the same may conform to the record of the case in the Patent Office.

Signed and sealed this 18th day of November, A. D., 1913.

[SEAL.]

R. T. FRAZIER,

*Acting Commissioner of Patents.*